United States Patent

Peana et al.

(10) Patent No.: US 9,558,562 B2
(45) Date of Patent: Jan. 31, 2017

(54) SYSTEM AND METHOD FOR REFLECTION MITIGATION USING BLUE NOISE PATTERN

(71) Applicant: Dell Products, LP, Round Rock, TX (US)

(72) Inventors: Stefan Peana, Austin, TX (US); James Sullivan, Westbury, NY (US)

(73) Assignee: DELL PRODUCTS, LP, Round Rock, TX (US)

( * ) Notice: Subject to any disclaimer, the term of this patent is extended or adjusted under 35 U.S.C. 154(b) by 24 days.

(21) Appl. No.: 14/619,720

(22) Filed: Feb. 11, 2015

(65) Prior Publication Data
US 2016/0232680 A1  Aug. 11, 2016

(51) Int. Cl.
G06T 7/00 (2006.01)
G06T 11/00 (2006.01)
G06T 5/00 (2006.01)
G06F 3/01 (2006.01)

(52) U.S. Cl.
CPC ............ *G06T 7/0085* (2013.01); *G06F 3/017* (2013.01); *G06T 5/003* (2013.01); *G06T 11/001* (2013.01); *G06T 2207/10004* (2013.01)

(58) Field of Classification Search
CPC ............................ G06T 7/0085; H04N 1/4051
USPC ....................................................... 345/207
See application file for complete search history.

(56) References Cited

U.S. PATENT DOCUMENTS

| 8,520,023 B2 | 8/2013 | Sullivan et al. |
| 8,860,781 B2 | 10/2014 | Nagaraj et al. |
| 2006/0082560 A1 | 4/2006 | Greer et al. |

OTHER PUBLICATIONS

Zhu, Wei, Kevin Parker, and Michael A Kriss. "Color Filter Arrays Based on Mutually Exclusive Blue Noise Patterns". Journal of Visual Communication and Image Representation 10.3 (1999): 245-267.*
Yik-Hing Fung, and Yuk-Hee Chan. "Green Noise Digital Halftoning With Multiscale Error Diffusion". IEEE Transactions on Image Processing 19.7 (2010): 1808-1823.*
"Front-of-screen (FOS) display components are key to optimizing optical performance in displays as well as user experiences," Iona Bita et al., SID; Society for Information Display, © 2011-2013.

* cited by examiner

*Primary Examiner* — Jacinta M Crawford
*Assistant Examiner* — Shivang Patel
(74) *Attorney, Agent, or Firm* — Larson Newman, LLP

(57) ABSTRACT

An information handling system includes a display for displaying an image and a processor. The processor is configured to receive an input image, determine if a pixel is in an edge region, generate an anti-reflective image by applying an edge preserving blue noise pattern to pixels within the edge region, and applying a mean persevering blue noise pattern to pixels outside of the edge region. The anti-reflective image is provided to the display. When displayed, the anti-reflective image reduces artifacts caused by reflection or glare on the display.

20 Claims, 8 Drawing Sheets

SYSTEM AND METHOD FOR REFLECTION MITIGATION USING BLUE NOISE PATTERN

FIELD OF THE DISCLOSURE

The present disclosure generally relates to information handling systems, and more particularly relates to reflection mitigation for information handling systems.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
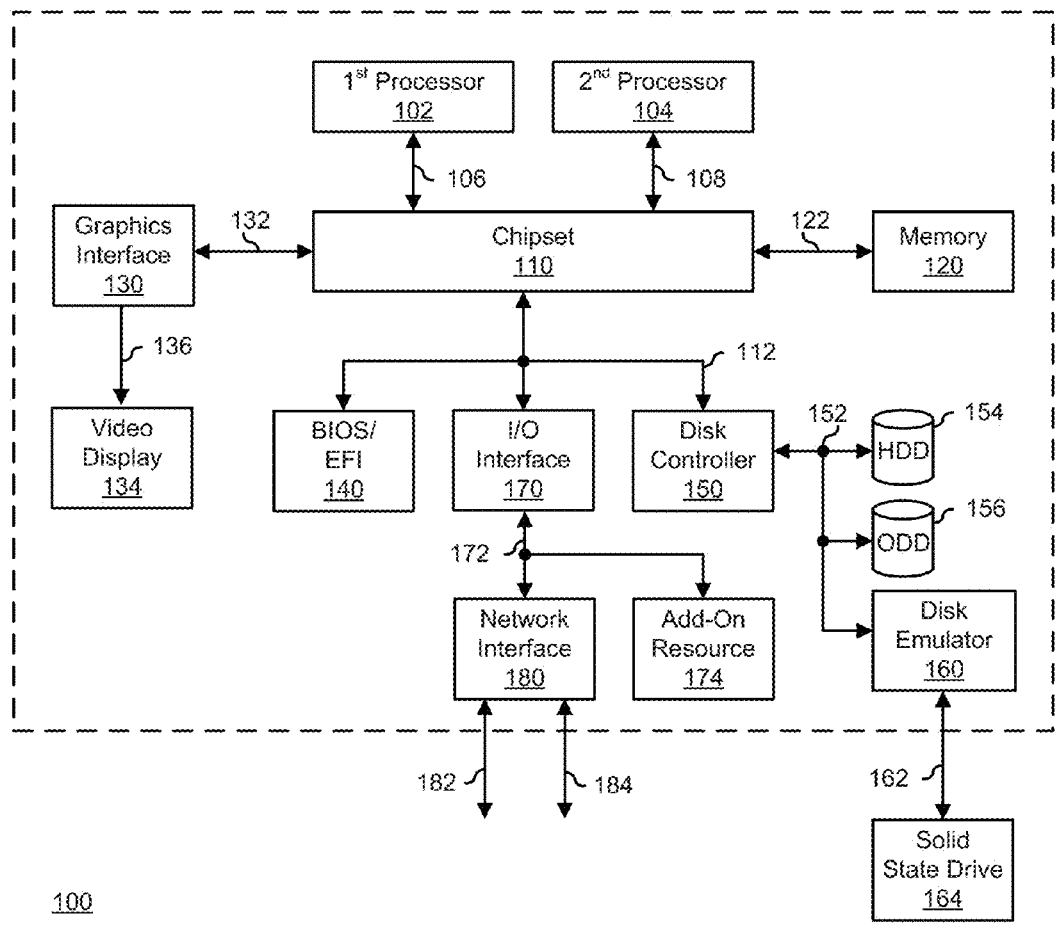
FIG. 1 is a block diagram illustrating an information handling system according to an embodiment of the present disclosure.

FIG. 1 illustrates a generalized embodiment of information handling system 100. For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 can include devices or modules that embody one or more of the devices or modules described above, and operates to perform one or more of the methods described above. Information handling system 100 includes a processors 102 and 104, a chipset 110, a memory 120, a graphics interface 130, include a basic input and output system/extensible firmware interface (BIOS/EFI) module 140, a disk controller 150, a disk emulator 160, an input/output (I/O) interface 170, and a network interface 180. Processor 102 is connected to chipset 110 via processor interface 106, and processor 104 is connected to chipset 110 via processor interface 108. Memory 120 is connected to chipset 110 via a memory bus 122. Graphics interface 130 is connected to chipset 110 via a graphics interface 132, and provides a video display output 136 to a video display 134. In a particular embodiment, information handling system 100 includes separate memories that are dedicated to each of processors 102 and 104 via separate memory interfaces. An example of memory 120 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 140, disk controller 150, and I/O interface 170 are connected to chipset 110 via an I/O channel 112. An example of I/O channel 112 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 110 can also include one or more other I/O interfaces, including an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. BIOS/EFI module 140 includes BIOS/EFI code operable to detect resources within information handling system 100, to provide drivers for the resources, initialize the resources, and access the resources. BIOS/EFI module 140 includes code that operates to detect resources within information handling system 100, to provide drivers for the resources, to initialize the resources, and to access the resources.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits a solid-state drive 164 to be connected to information handling system 100 via an external interface 162. An example of external interface 162 includes a USB interface, an IEEE 1194 (Firewire) interface, a proprietary interface, or a combination thereof. Alternatively, solid-state drive 164 can be disposed within information handling system 100.

I/O interface 170 includes a peripheral interface 172 that connects the I/O interface to an add-on resource 174 and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a NIC disposed within information handling system 100, on a main circuit board of the information handling system, integrated onto another component such as chipset 110, in another suitable location, or a combination thereof. Network interface device 180 includes network channels 182 and 184 that provide interfaces to devices that are external to information handling system 100. In a particular embodiment, network channels 182 and 184 are of a different type than peripheral channel 172 and network interface 180 translates information from a format suitable to the peripheral channel to a format suitable to external devices. An example of network channels 182 and 184 includes InfiniBand channels, Fibre Channel channels, Gigabit Ethernet channels, proprietary channel architectures, or a combination thereof. Network channels 182 and 184 can be connected to external network resources (not illustrated). The network resource can include another information handling system, a data storage system, another network, a grid management system, another suitable resource, or a combination thereof.

Figure 2:
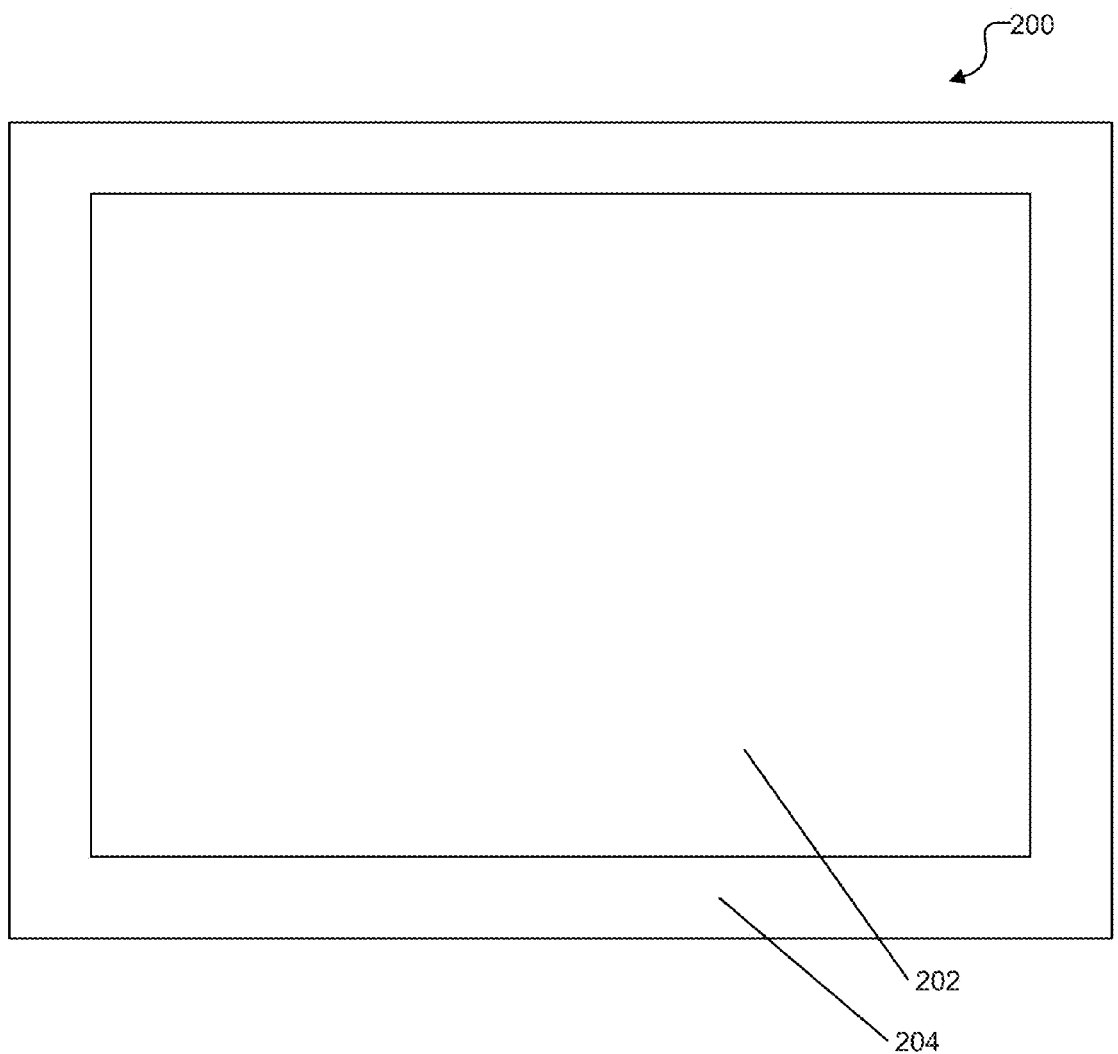
FIG. 2 is a diagram illustrating a surface view of a display.

FIG. 2 illustrates a surface view of a display assembly 200. Active display area 202 can define a center portion of the display assembly surface view 200, and a bezel region 204 can define the perimeter of the display assembly surface view 200. In various embodiments, active display area 202 can also incorporate a touch sensitive area.

Figure 3:
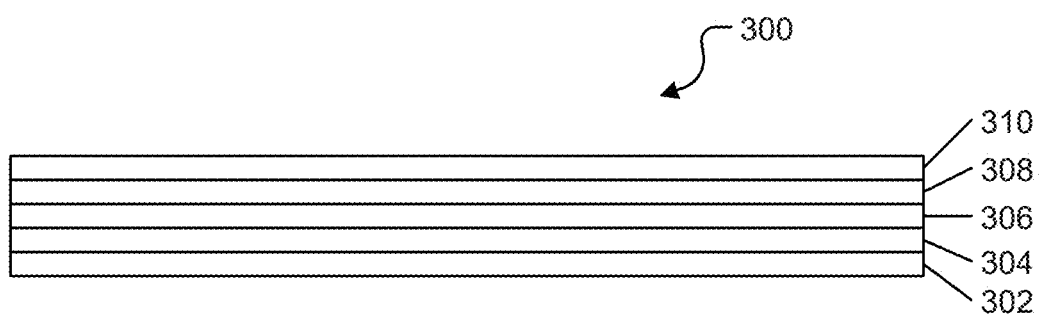
FIG. 3 is a diagram illustrating a cross-sectional view of a display.

FIG. 3 illustrates a cross section of a display assembly 300 that includes a display layer 302, an optically clear adhesive layer 304, an optional touch sensitive layer 306, a cover layer 308, and an antireflective coating 310. Display layer can include a liquid crystal display, an organic light emitting diode display, or other display technology. The optional touch sensitive layer 306 can include resistive touch sensors, capacitive touch sensors, or other touch sensor technologies. Optically clear adhesive layer 304 can bond the display layer and the touch sensitive layer, filling in any air gaps between the layers to improve the optical characteristics of the display assembly. Cover layer 308 can be a glass or plastic layer to protect the display layer 302 and the touch sensitive layer 306. Preferably, cover layer 308 can be a hard layer that is resistant to scratches and breakage. For example, the cover layer 308 can be Corning Gorilla glass. Cover layer 308 can be coated with anti-reflective coating 310 to reduce glare and reflections from the surface of the display assembly. Optionally, another optically clear adhesive layer (not shown) can be between touch sensitive layer 306 and cover layer 308.

In various embodiments, anti-reflective coating 310 can be added to reduce reflections and glare due to ambient lighting in well-lit environments. However, the anti-reflective coating 310 can impact screen brightness. Further, anti-reflective coating 310 may not be durable enough for daily use and performance may diminish over time, such as due to scratches and abrasions that remove anti-reflective coating 310.

Figure 4A:
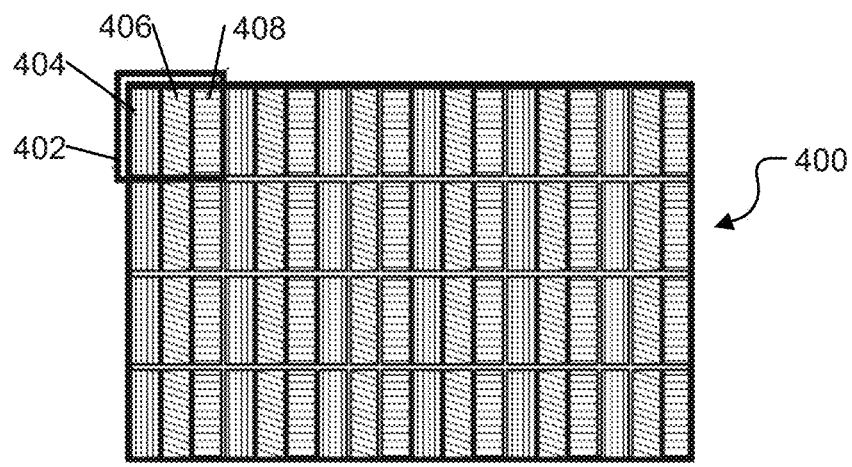
FIGS. 4A, 4B, and 4C are diagrams illustrating various sub-pixel configurations.
Figure 4B:
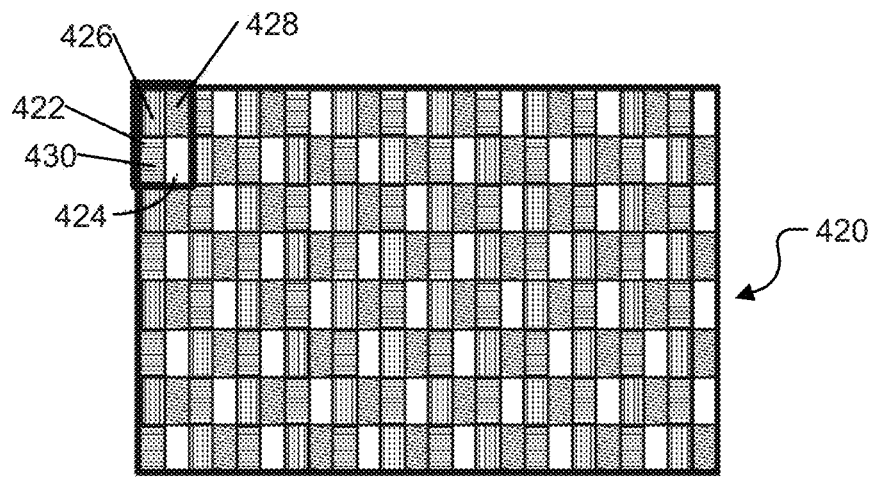
Figure 4C:
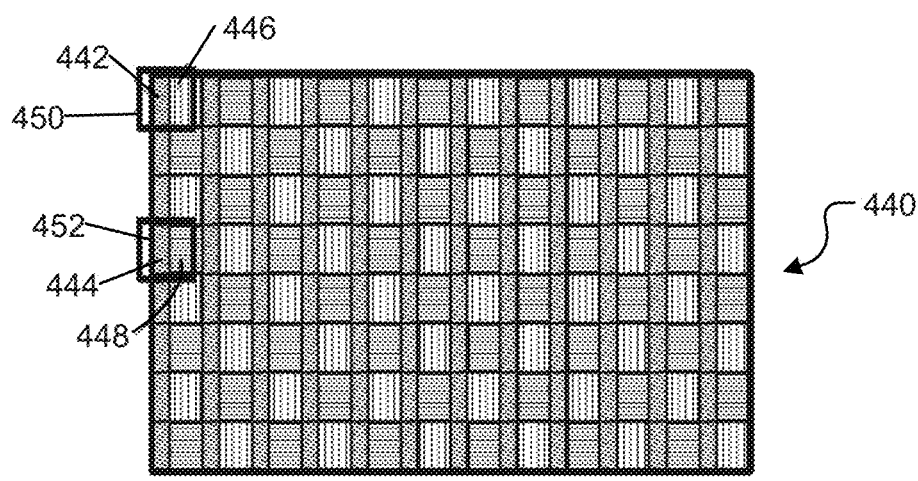

FIG. 4A through FIG. 4C show various sub pixel configurations. Historically, displays have used combinations of red, green, and blue subpixels to generate the spectrum of colors seen by the human eye. FIG. 4A illustrates an embodiment of a standard RGB configuration 400 where pixel 402 comprising a red sub-pixel 404, a green sub-pixel 406, and a blue sub-pixel 408. More recently, other sub-pixel configurations have been developed incorporating additional sub-pixels to improve the color quality, brightness, and dynamic range of the display.

FIG. 4B shows an exemplary RGBW configuration 420, in which pixel 422 can include a white sub-pixel 424 in addition to the red sub-pixel 426, green sub-pixel 428, and blue sub-pixels 430. The white sub-pixel can be used to increase the overall transmittance of the pixel, while the red, green, and blue sub-pixels can be used to control the color of the pixel. Overall, the use of the white sub-pixel can increase the brightness of the display.

FIG. 4C shows an exemplary RGBG configuration 440 that can be used in AMOLED (Active Matrix Organic Light Emitting Diode) and plasma displays. The RGBG configuration uses green sub-pixels 442 and 444 interleaved with alternating red sub-pixels 446 and blue sub-pixels 448. In various embodiments, pixel 450 can include green sub-pixel 442 and red sub-pixel 446 and pixel 452 can include green sub-pixel 444 and blue sub-pixel 448. In various embodiments, the human eye can be most sensitive to green, especially for high-resolution luminance information. The green sub-pixels can be mapped to input pixels on a one to one basis with the red and blue sub-pixels being subsampled to reconstruct the chroma signal at a lower resolution. The green sub-pixels can provide for a majority of the reconstruction of the luminance signal. While the red and blue sub-pixels can reconstruct the horizontal and vertical spatial frequencies, they may not reconstruct the highest diagonal spatial frequencies. Diagonal high spatial frequency information in the red and blue channels of the input image can be transferred to the green sub-pixels for image reconstruction. RGBG configuration can create a color display with one third fewer sub-pixels than a traditional RGB configuration, that is two sub-pixels per pixel rather than three, but with the same measured luminance display resolution.

In accordance with disclosed embodiments, glare and reflections can be treated as a low amplitude noise scattered in the field of view. Adding noise to the displayed image to interfere with the reflections while preserving edges and image sharpness can mitigate reflections and glare without the drawbacks of other anti-reflective methods, such as the use of anti-reflective coatings.

Figure 5:
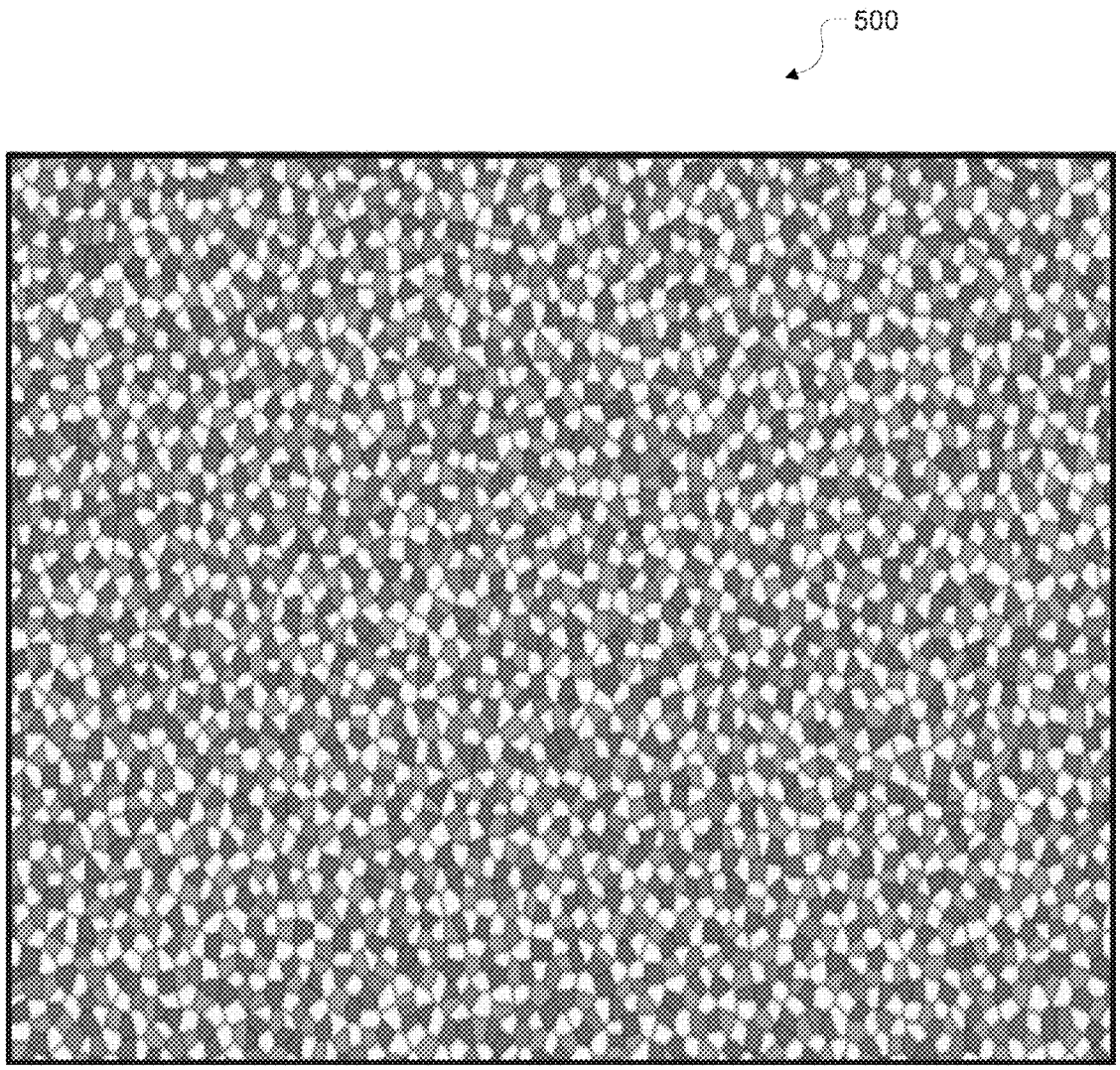
FIG. 5 is an exemplary mean preserving blue noise pattern, in accordance with various embodiments.

FIG. 5 is an exemplary pattern 500 of blue noise. Blue noise can be a pattern with minimal low frequency components and no concentrated spikes in energy. In exemplary embodiments, a blue noise pattern, such as a 2-bit pattern or a 4-bit pattern, can be added to the image, such as after contrast, color, and sharpness corrections are applied. The blue noise pattern 500 can be applied to flat regions (non-edges) of the image. Exemplary pattern 500 can preserve the mean color and mean brightness of the flat regions while applying noise across the individual pixels to reduce the reflection or glare effect.

Figure 6:
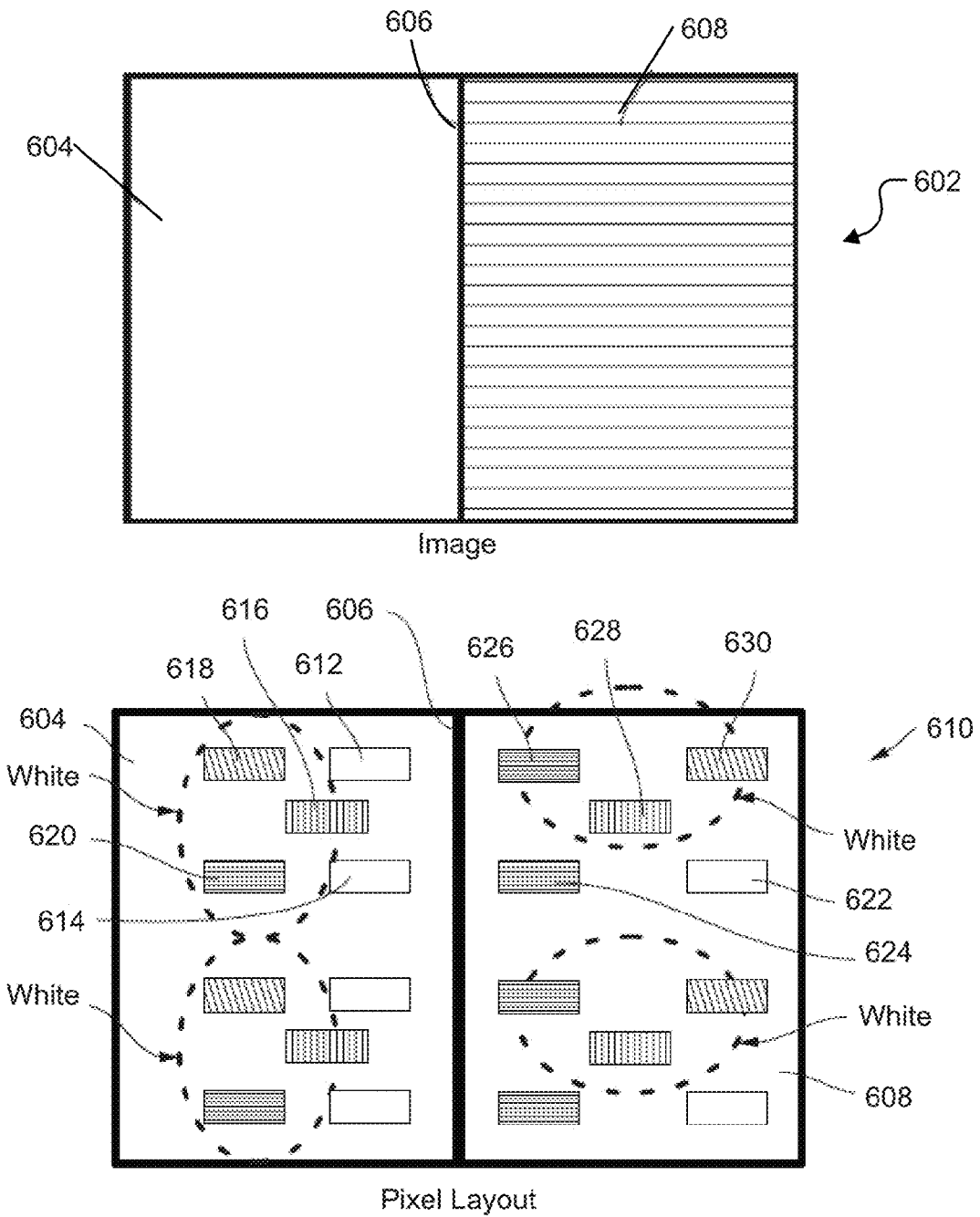
FIG. 6 is an exemplary edge preserving blue noise pattern, in accordance with various embodiments.

FIG. 6 illustrates application of blue noise to an edge (or transition) in an image. The blue noise added to edges or transitions in the image can have an edge preserving property. An exemplary edge region of an image, as illustrated in block 602, includes white side 604 and blue side 608 with edge 606 marking the transition between white and blue. Block 610 illustrates the pixel layout for the same edge or transition in the image at a sub-pixel level. On white side 604, noise can be added to a cluster of 5 pixels (pixels 612, 614, 616, 618, and 620), such that the overall appearance of the image and added noise is white. For example, pixels 612 and 614 can be white while red, green, and blue can be added to pixels 616, 618, and 620 respectively. The addition of red, green, and blue can appear as an overall white addition, similar to the use of red, green, and blue sub-pixels to produce white on a display. On blue side 608, noise can be added to a cluster of 5 pixels (pixels 622, 624, 626, 628, and 630), such that the overall appearance of the image remains blue. For example, white can be added to pixel 622, blue can be added to pixels 624 and 626, and red and green can be added to pixels 628 and 630, respectively. While the combination of red, green, and blue in pixels 626, 628, and 630 can appear white, the addition of blue to pixel 624 without an offsetting addition of red and green to the pixel cluster generates an overall blue appearance. Furthermore, it should be noted that the pixels immediately adjacent to the transition 606, that is pixels 612, 614, 624, and 626, can correspond to the color on each side of transition 606. The effect can be that the transition is sharp, while noise is added throughout the image. Notably, the pixels are arranged in a diamond pattern.

Figure 7:
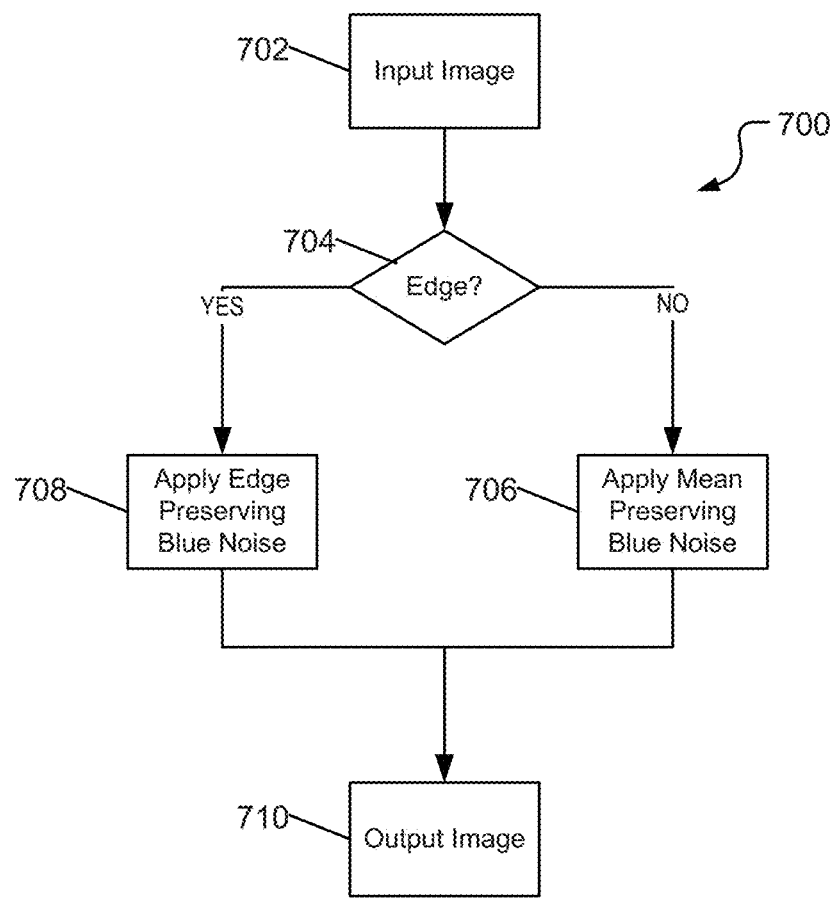
FIG. 7 is a flow diagram illustrating a method of mitigating reflections, in accordance with various embodiments.

FIG. 7 shows a flow diagram 700 for the addition of noise to the output image to reduce the affect from glare. In various embodiments, the addition of noise to reduce glare effects can be performed after contrast, color, and sharpness corrections are applied to the image to avoid "enhancing" the noise with the other corrections. Thus, input image 702 can be an image provided to a glare correction module after other corrections, such as contrast, color, and sharpness corrections, have been applied. At 704, edge detection can be performed. For pixels that are not part of an edge region, blue noise can be added, such as by adding the blue noise pattern shown in FIG. 5, to preserve the mean color values of the region, as illustrated at 706. For pixels that are part of an edge region, blue noise can be added to preserve the edges, such as in accordance with the pattern described with respect to FIG. 6, as illustrated at 708. Output Image 710 can include a combine of blue noise (either as part of an edge region or as flat blue noise) and the input image for each pixel.

In various embodiments, input from an ambient light sensor can be used to modify the amount of blue noise added to the image. For example, in bright light conditions (where glare is likely to be an issue), blue noise can be added, while in low light conditions (where glare is unlikely to be an issue), no blue noise can be added. In environments where the ambient light sensor detects a moderate amount of light, the amount of blue noise added may be reduced, as the amount of glare can be lower.

In various embodiments, the location of a light source can be detected and the location can be used to modify the amount of blue noise added to the image. For example, a video camera built into the display or device can be used to determine the location of the light source. For example, a light source located generally behind the user can cause reflections and glare on the display, however a light source located behind the display and away from the user may not produce noticeable reflections and glare. As such, the amount of anti-reflective blue noise added to the image may be higher when the light source is in a location likely to produce glare or reflections and lower when the light source is positioned to not produce noticeable glare or reflections.

In various embodiments, the orientation of the display can be determined and the orientation can be used to modify the amount of anti-reflective blue noise added to the image. An orientation sensor, such as a gyroscope, built into the display or device may be used to detect orientation.

In various embodiments, information about at least two of the ambient light conditions, the location of a light source, and the orientation of the display can be combined to determine the amount of anti-reflective blue noise added to the image.

To apply the noise in a manner undetectable by the user, it may be necessary to increase the pixel density. For example, at a 10 inch viewing distance, 300 pixels per inch is sufficient resolution that the human eye cannot discern individual pixels. For example, when using 2 sub-pixels per pixel to apply the blue noise, to ensure the noise is outside the image frequency range, it can be necessary to increase the sampling to ½ the pixel to pixel distance, in accordance with the Nyquist frequency. In a display using a square arrangement of pixels, if could be necessary to double the number of sub-pixels to achieve the desired affect. However, in a diamond arrangement, the distance between the pixels is smaller, and the same affect can be achieved with an approximately 50% increase in the number of sub-pixels.

Figure 8:
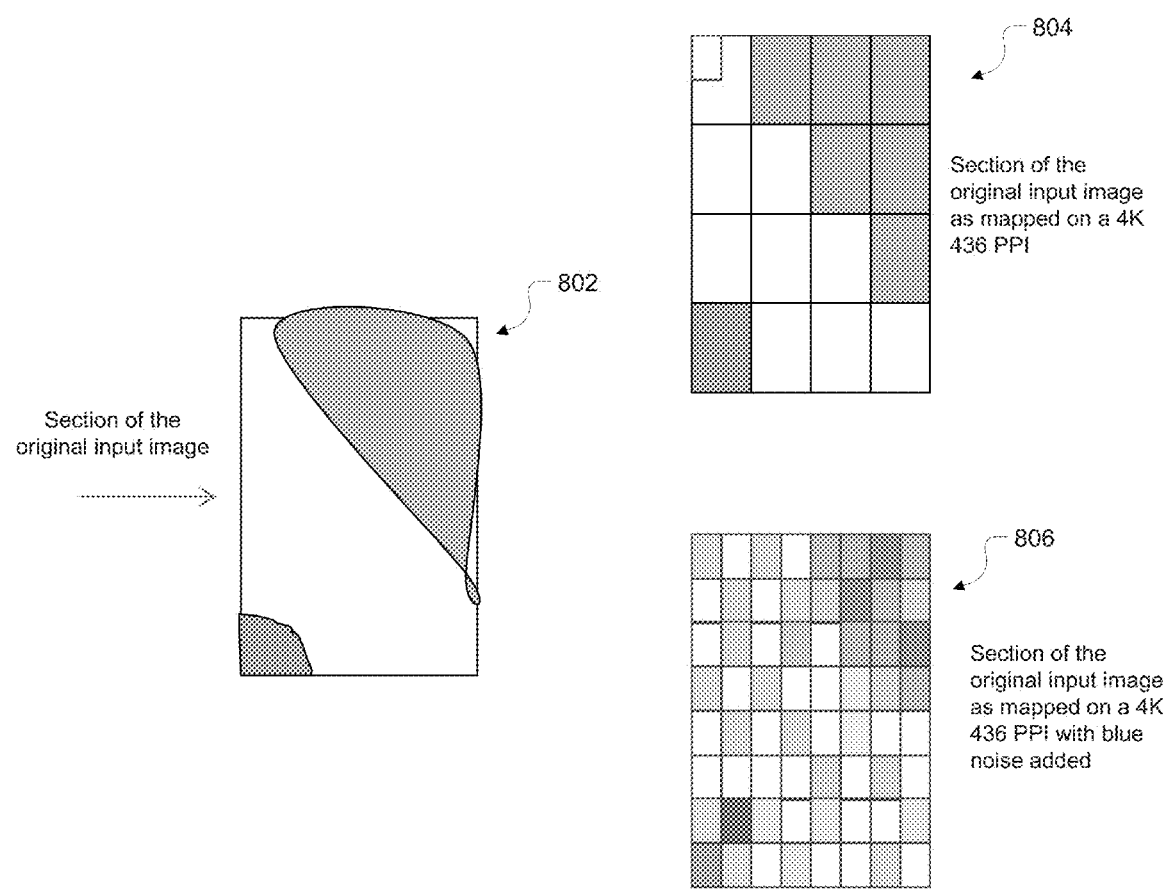
FIG. 8 is an exemplary image mapping, in accordance with various embodiments.

Referring to FIG. 8, input image 802 shows a portion of the input image. Mapped image 804 shows the section of the original input image mapped on a display, where each of the large squares represents a pixel. Image 806 shows the image with mapped to the display with blue noise added in the subpixels.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality.

The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method for reducing artifacts caused by reflection or glare in displayed images, comprising:
    receiving an input image;
    determining if a pixel of the input image is in an edge region;
    generating an anti-reflective image by applying an edge preserving blue noise to pixels of the input image within the edge region, and applying a mean preserving blue noise to pixels of the input image outside of the edge region, wherein the edge preserving blue noise adds noise to a first pixel cluster on a first side of an edge such that the overall appearance of the noise added to the first pixel cluster is a first color and the noise added to the pixels of the pixel cluster immediately adjacent to the edge corresponds to the first color and adds noise to a second pixel cluster on a second side of the edge such that the overall appearance of the noise added to the second pixel cluster is a second color and the noise added to the pixels of the pixel cluster immediately adjacent to the edge corresponds to the second color; and
    displaying the anti-reflective image on a display such that artifacts caused by reflection or glare on the display are reduced compared to displaying the input image on the display.

2. The method of claim 1, further comprising adjusting the amount of the edge preserving blue noise and mean preserving blue noise based on an amount of ambient light.

3. The method of claim 2, further comprising receiving input from an ambient light sensor to determine an amount of ambient light.

4. The method of claim 1, further comprising adjusting the amount of the edge preserving blue noise and mean preserving blue noise based on a location of a light source.

5. The method of claim 1, further comprising adjusting the amount of the edge preserving blue noise and mean preserving blue noise based on an orientation of the display.

6. The method of claim 5, further comprising receiving input from an orientation sensor to determine the orientation of the display.

7. An information handling system with reduced artifacts from reflections and glare in displayed images, comprising:
   a display for displaying an image; and
   a processor configured to:
      receive an input image;
      determine if a pixel is in an edge region;
      generate an anti-reflective image by applying an edge preserving blue noise pattern to pixels of the input image within the edge region, and applying a mean preserving blue noise pattern to pixels of the input image outside of the edge region, wherein the edge preserving blue noise adds noise to a first pixel cluster on a first side of an edge such that the overall appearance of the noise added to the first pixel cluster is a first color and the noise added to the pixels of the pixel cluster immediately adjacent to the edge corresponds to the first color and adds noise to a second pixel cluster on a second side of the edge such that the overall appearance of the noise added to the second pixel cluster is a second color and the noise added to the pixels of the pixel cluster immediately adjacent to the edge corresponds to the second color; and
      provide the anti-reflective image to the display, whereby when displayed, the anti-reflective image reduces artifacts caused by reflection or glare on the display compared to the displaying the input image on the display.

8. The information handling system of claim 7, wherein the display has a diamond pixel arrangement.

9. The information handling system of claim 7, wherein the processor is further configured to adjust the amount of the edge preserving blue noise and mean preserving blue noise based on an amount of ambient light.

10. The information handling system of claim 9, further comprising an ambient light sensor, the processor further configured to determine the amount of ambient light based on input from the ambient light sensor.

11. The information handling system of claim 7, wherein the processor is further configured to adjust the amount of the edge preserving blue noise and mean preserving blue noise based on a location of a light source.

12. The information handling system of claim 11, further comprising an image sensor, the processor further configured to detect a location of the light source based on input from the image sensor.

13. The information handling system of claim 7, further comprising an orientation sensor, the processor further configured to determine an orientation of the display based on input from the orientation sensor and to adjust the amount of the edge preserving blue noise and mean preserving blue noise based on the orientation of the display.

14. A non-transitory computer-readable medium including a plurality of instructions to manipulate a processor, the plurality of instructions comprising:
   instructions to receive an input image;
   instructions to determine if a pixel is in an edge region;
   instructions to generate an anti-reflective image by applying an edge preserving blue noise to pixels of the input image within the edge region, and applying a mean preserving blue noise to pixels of the input image outside of the edge region, wherein the edge preserving blue noise adds noise to a first pixel cluster on a first side of an edge such that the overall appearance of the noise added to the first pixel duster is a first color and the noise added to the pixels of the pixel cluster immediately adjacent to the edge corresponds to the first color and adds noise to a second pixel cluster on a second side of the edge such that the overall appearance of the noise added to the second pixel cluster is a second color and the noise added to the pixels of the pixel cluster immediately adjacent to the edge corresponds to the second color; and
   instructions to display the anti-reflective image on a display such artifacts caused by reflection or glare on the display are reduced compared to displaying the input image on the display.

15. The non-transitory computer-readable medium of claim 14, further comprising instructions to adjusting the amount of the edge preserving blue noise and mean preserving blue noise based on an amount of ambient light.

16. The non-transitory computer-readable medium of claim 15, further comprising instructions to determine an amount of ambient light based on input received from an ambient light sensor.

17. The non-transitory computer-readable medium of claim 14, further comprising instructions to adjust the amount of the edge preserving blue noise and mean preserving blue noise based on a location of a light source.

18. The non-transitory computer-readable medium of claim 17, further comprising instructions to determine the location of the light source based on input received from an image sensor.

19. The non-transitory computer-readable medium of claim 14, further comprising instructions to adjust the amount of the edge preserving blue noise and mean preserving blue noise based on an orientation of the display.

20. The non-transitory computer-readable medium of claim 19, further comprising instructions to determine the orientation of the display based on input received from an orientation sensor.

* * * * *